Dec. 10, 1963  T. L. BUSH ETAL  3,113,340
APPARATUS FOR HUMANE HANDLING OF ANIMAL LIVESTOCK FOR SLAUGHTER
Filed Aug. 30, 1960  5 Sheets-Sheet 1

INVENTORS
Thomas L. Bush
Daniel Hoober
Daniel J. Herkes
BY
Samuel Lebowitz
ATTORNEY Dec. 10, 1963  T. L. BUSH ETAL  3,113,340
APPARATUS FOR HUMANE HANDLING OF ANIMAL LIVESTOCK FOR SLAUGHTER
Filed Aug. 30, 1960  5 Sheets-Sheet 2
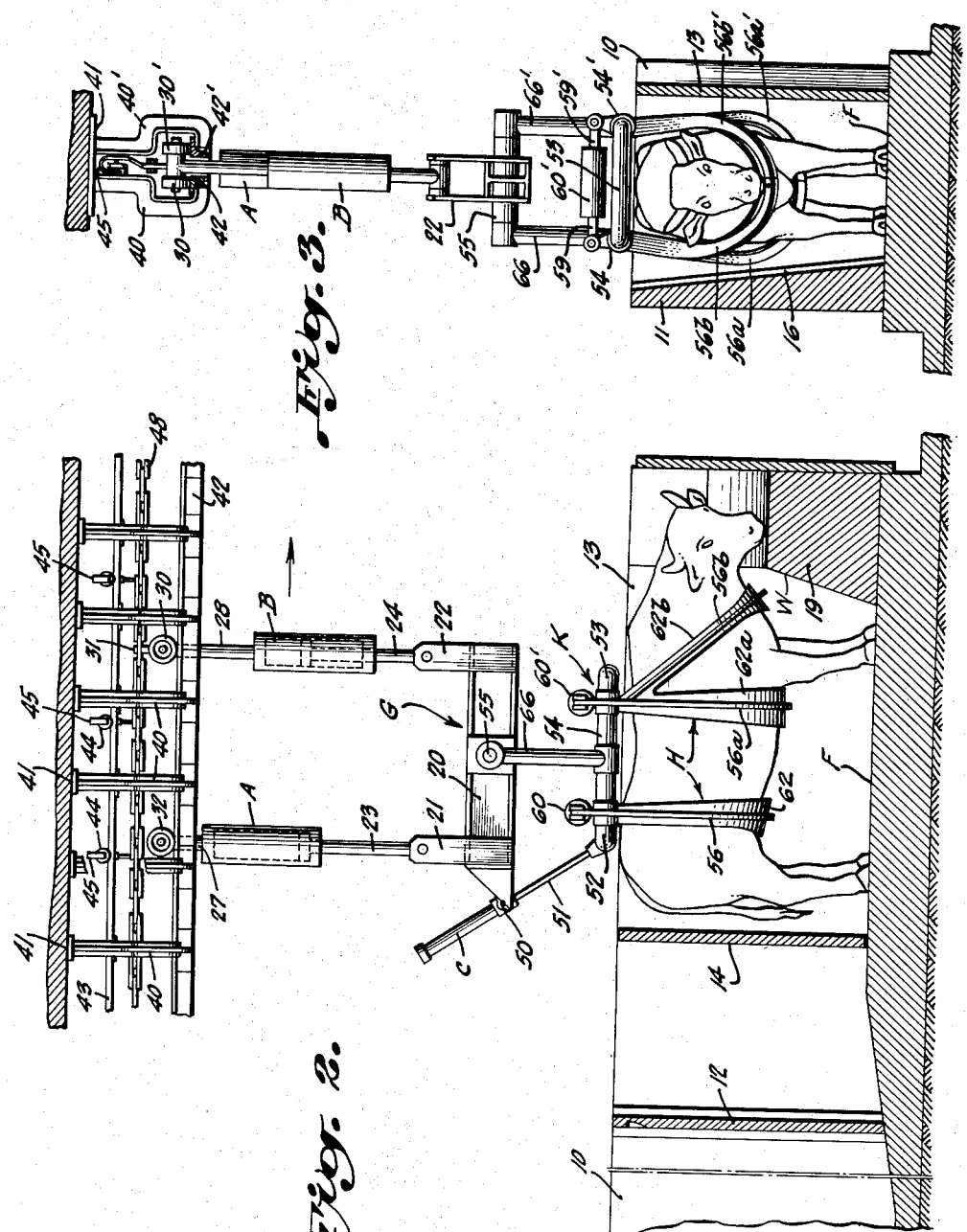
INVENTORS
THOMAS L. BUSH
DANIEL HOOBER
DANIEL J. HERKES
BY
Samuel Klontz
ATTORNEY

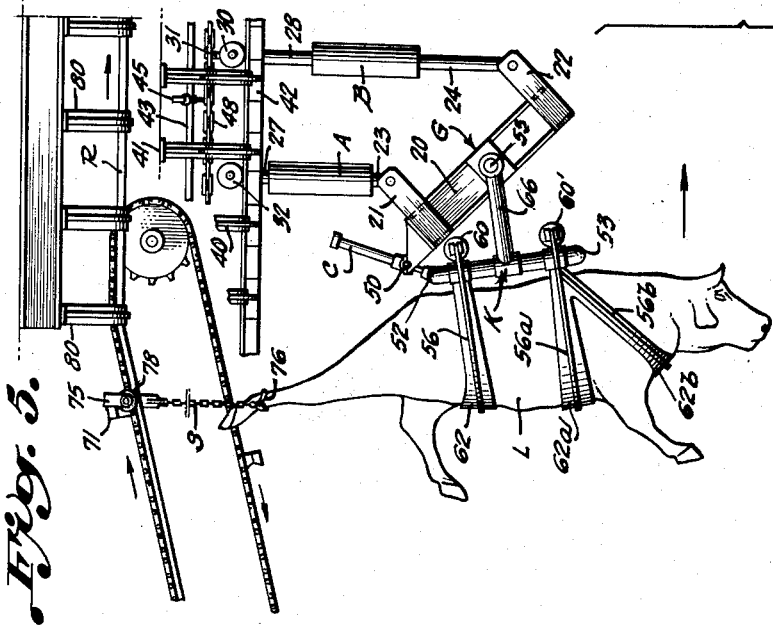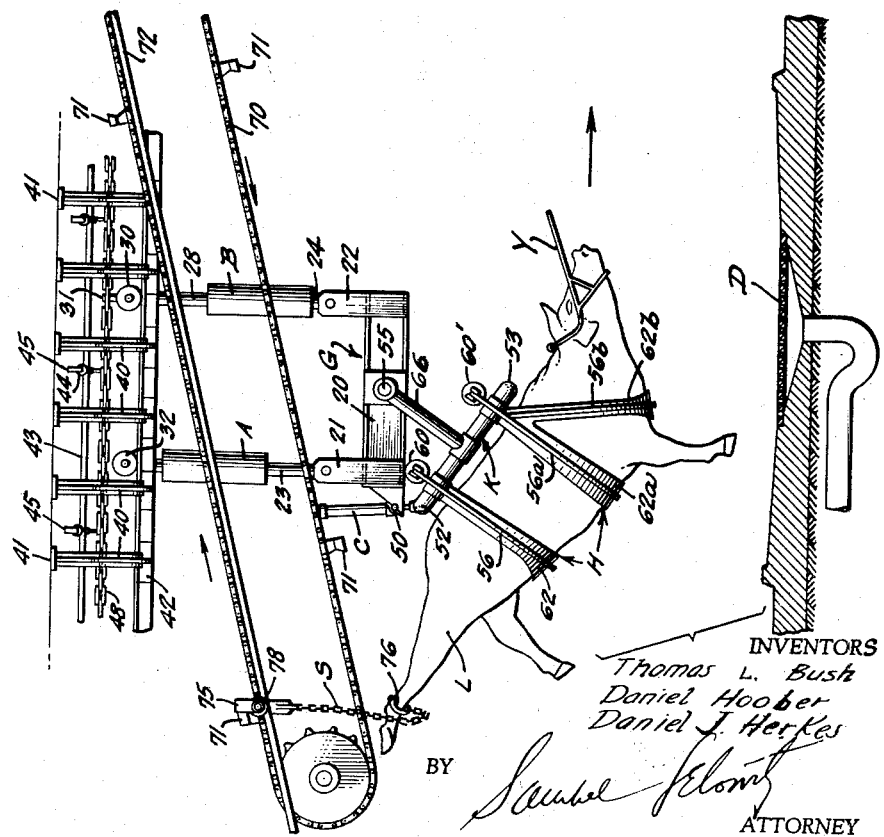

Dec. 10, 1963 T. L. BUSH ETAL 3,113,340
APPARATUS FOR HUMANE HANDLING OF ANIMAL LIVESTOCK FOR SLAUGHTER
Filed Aug. 30, 1960 5 Sheets-Sheet 4
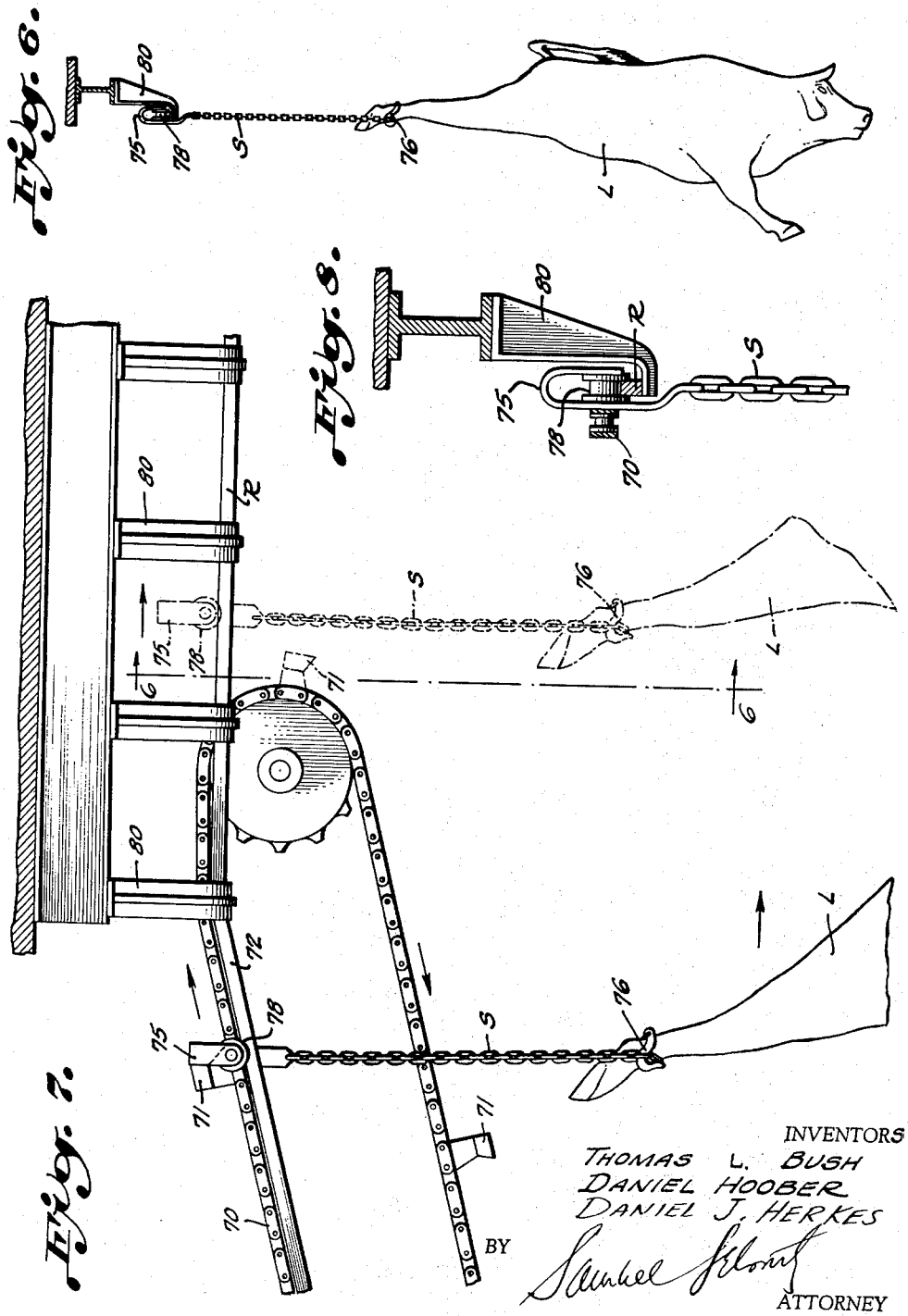
INVENTORS
THOMAS L. BUSH
DANIEL HOOBER
DANIEL J. HERKES
BY
ATTORNEY

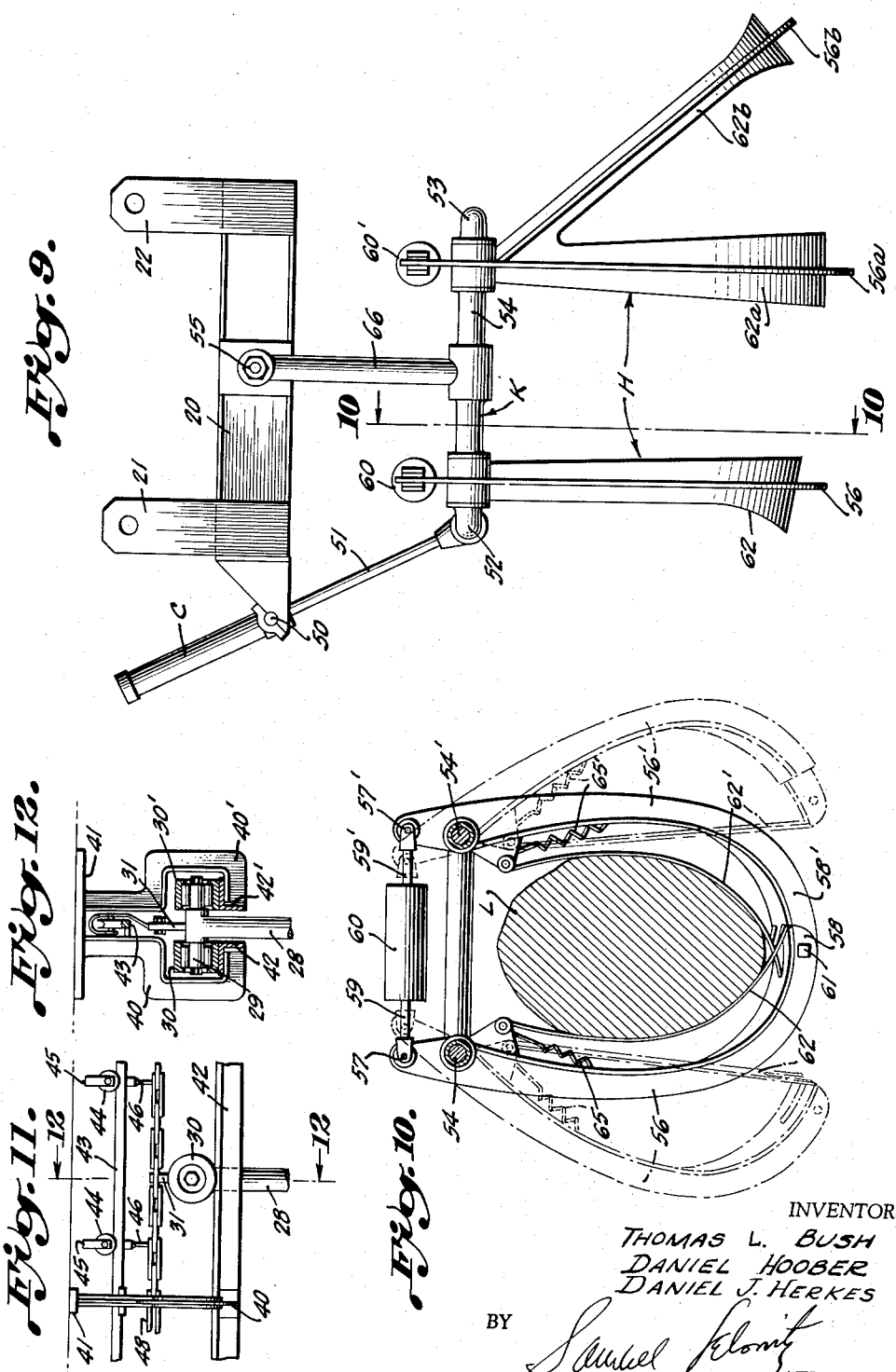

United States Patent Office 3,113,340
Patented Dec. 10, 1963

3,113,340
APPARATUS FOR HUMANE HANDLING OF ANIMAL LIVESTOCK FOR SLAUGHTER
Thomas L. Bush, Chicago, Daniel Hoober, Skokie, and Daniel J. Herkes, Aurora, Ill., assignors to Synagogue Council of America and National Community Relations Advisory Council, both of New York, N.Y.
Filed Aug. 30, 1960, Ser. No. 52,986
15 Claims. (Cl. 17—1)

This invention relates to an apparatus for handling animal livestock preparatory to and in the course of their slaughtering.

It is the object of the present invention to provide a system for handling animal livestock humanely in the course of their preparation for slaughter, irrespective of the specific mode of killing the animals.

It is another object of the invention to provide for the efficient slaughtering of animal livestock, or the handling thereof in connection with slaughtering, in a manner which is considered humane under the provisions of Federal Public Law 85—765, dealing with humane methods of slaughtering livestock, or pursuant to the principles promulgated by animal humane societies which have urged such legislation by both Federal and State authorities.

It is a further object of the invention to provide a system which is universally adaptable to slaughterhouse operations of any size or layout, and which is characterized by comparatively low costs of installation, maintenance and operation, and one affording maximum room consistent with such a mechanized unit, and safety to operating personnel.

It is a primary object of the invention to provide an installation for the handling of livestock in preparation for their slaughter, which is universally adaptable either for slaughtering in accordance with the ritual requirements of the Jewish faith, or for slaughtering in any other manner by first rendering the animals insensible to pain by a single blow or gunshot, or by electrical, chemical or other means that is rapid and effective.

It is another object of the invention to provide a system which lends itself to slaughtering operations at a rapid rate, which may be expedited by automation procedures, to expedite the handling and slaughtering of successive animals so that a high output capacity may be attained.

The invention proceeds upon the principle of providing a restraining station for an individual animal, to which the same is led, at the terminal point of a converging chute along which the succesive animals travel from their confining pens. The animal within a confining compartment of the terminal pen, in upright position, is embraced by a specially designed body harness in the form of swing grips or grapples to support and cradle the animal with no pain or injury thereto, for lifting to a slight extent and transport to a slaughtering station.

In the case of slaughtering in accordance with ritual requirements, the forepart of the animal is mechanically tilted down to a degree in the course of its transport, and is halted momentarily at the slaughtering station whereat the religious functionary and his assistant perform the act of slaughtering causing the animal to lose consciousness instantaneously by anemia of the brain in consequence of the simultaneous and instantaneous severance of the carotid arteries with a sharp instrument. Following this operation, the slaughtered animal is supplementarily transported mechanically along a rail which hoists the animal in its unconscious state towards the bleeding rail whereat the same arrives in nearly vertically suspended position. When this point is reached, and the hoisted animal is transferred automatically to the bleeding rail, the swing grips are released therefrom for conveyance to the restraining station for application to another animal in the confining compartment of the terminal pen.

In the case of slaughtering of animals by methods other than those prescribed by ritual requirements, the animal in its cradled condition is rendered insensible to pain in any accepted manner known in the art, and thereafter the animal is conveyed to a slaughtering station, which may be disposed adjacent to the starting point of the bleeding rail, whereat the animal may be slaughtered in any well-known manner. The animal is moved along the bleeding rail preparatory to the usual slaughterhouse meat processing and dressing operations, after the swing grips are released therefrom, which are conveyed mechanically to the starting station for mounting upon another live animal in the confining compartment of the terminal pen.

Other objects and purposes will appear from the detailed description of the invention following hereinafter, taken in conjunction with the accompanying drawings, wherein FIG. 1 is a plan view of the general layout of the livestock handling system in accordance with the invention, and indicating schematically and in dotted lines the three main operating stations of the system;

FIG. 2 is a front elevation of the animal gripping apparatus in accordance with the invention, with the animal segregated in its confining compartment in fully conscious and healthy state;

FIG. 3 is a right end view of FIG. 2 with certain parts omitted to clarify the illustration of the essential parts.

FIG. 4 is a side elevation of the system with the animal in position II of FIG. 1, representing the slaughtering station for ritual slaughter;

FIG. 5 is an elevational view of the system with the animal shown in FIG. 4 at station III of FIG. 1, adjacent to the starting point of the bleeding rail;

FIG. 6 is a view of the slaughtered animal in its suspended state on the bleeding rail following the transfer of the shackle chain and trolley thereto, taken along line 6—6 of FIG. 7 with at least one slaughtered animal on the bleeding rail at the position indicated in dotted lines in FIG. 7;

FIG. 7 is an enlarged view showing the details of the transfer mechanism for shifting the hoisted animal from the inclined chain lift to the bleeding rail;

FIG. 8 is a vertical sectional view showing in greater detail and on an enlarged scale the upper portion of FIG. 6;

FIG. 9 is a front elevation, on an enlarged scale, of the swing grip mechanism for embracing and cradling the livestock animal to handle the same humanely preparatory to the slaughter thereof;

FIG. 10 is a vertical sectional view along line 10—10 of FIG. 9, showing the manner in which the swing grip mechanism operates to embrace the livestock animal from the opposite sides thereof;

FIG. 11 is an enlarged elevation of the upper portion of FIG. 2, illustrating the rail support and chain actuator for the swing grip frames in accordance with the invention, for moving the frames successively through the several operating stations; and FIG. 12 is a vertical sectional view along line 12—12 of FIG. 11.

Figure 1:
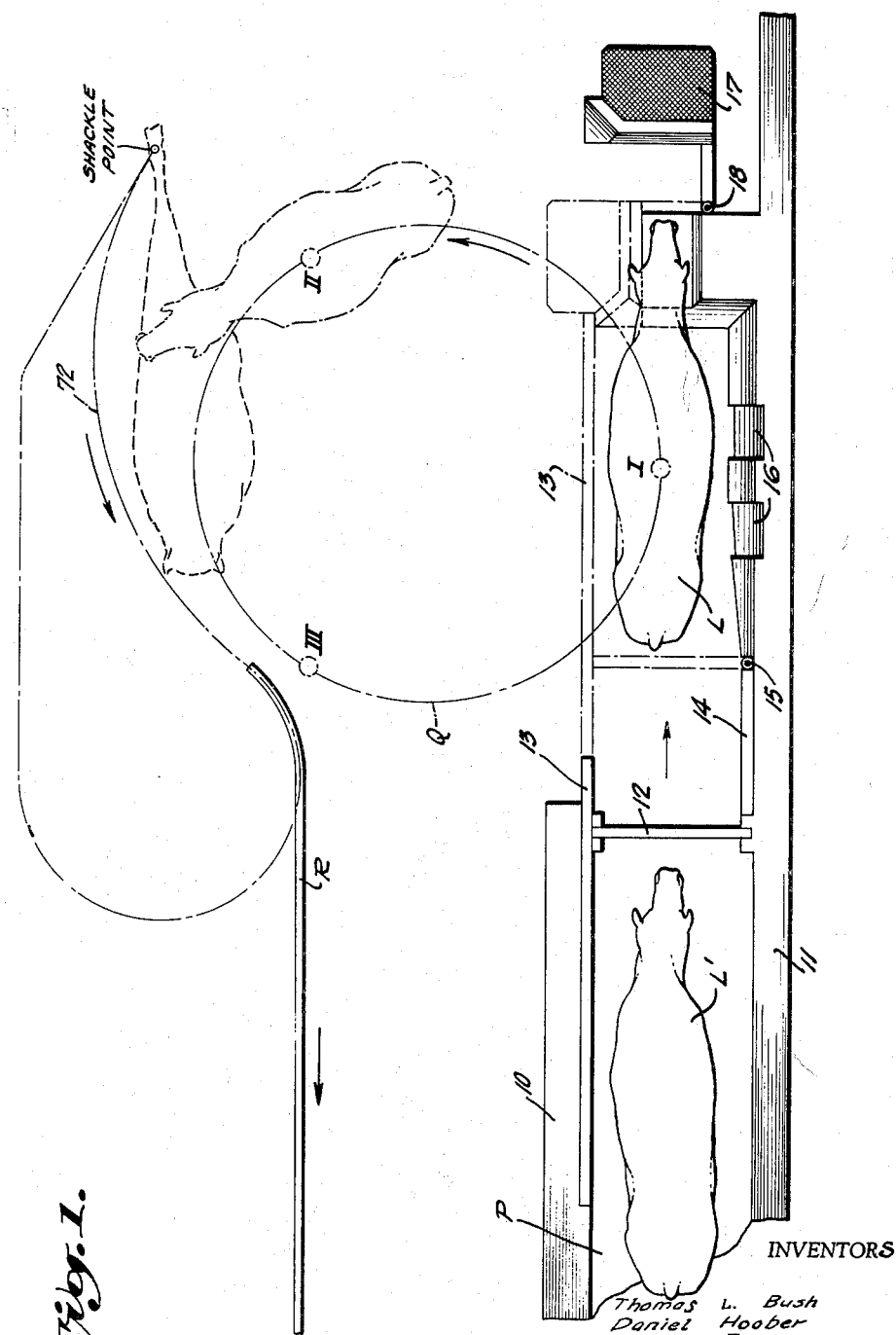

In FIG. 1 is shown a general plan view of the system, which may be installed adjacent to the site of conventionally located knocking pens. The slaughtering station is at the right end of the installation with the guide chute for the live animals leading thereto and with a bleeding rail for the slaughtered animals extending therefrom. The space between the guide chute and bleeding rail may be used for housing the slaughterhouse and operating equipment.

FIG. 1 shows the terminal end of the pen P as the animals are moved along in single file between lateral walls 10 and 11. A vertically moving drop gate 12, between the walls 10 and 11, serves to separate the lead animal L from the rest of the animals L'. The lead animal L is moved forward into the forepart of the chute, whereat the floor F is raised (FIG. 2) beyond a ramp approach thereto. A swing gate 14, pivotally mounted on hinges 15 on front wall 11, serves to close in on the rear of the animal and slidable gate 13 in wall 10 moves forwardly, as indicated in dotted lines in FIG. 1, to confine the animal in a terminal compartment as shown in FIGS. 1 and 2. In addition, the inner face of side wall 11 and the front wall W are tapered downwardly to sustain the animal and to prevent it from dropping to its knees or from lying down, and its head is also constrained, within limits, in the forepart of the compartment by the block 19.

The gates 13 and 14 may be power-operated and manually controlled.

The system in accordance with the invention consists of a circular overhead chain drive to which three swing grips units are attached. These units provide continuous and successive transport of animals through three operating stations. In passing through the three stations, the animal is gradually tilted into a position approximately 80° to the horizontal, and its weight is gradually transferred from the swing grips to a standard leg shackle. At station I, the animal is gripped and lifted; at station II, the act of ritual slaughtering may be performed; at station III, the animal is transferred to the bleeding rail.

The overhead swing grips units for embracing the animal, described in detail below, are designed to be lowered in position to cradle the animal at its belly and chest by means of the body harness H shown generally in FIG. 2, and the movement of this harness in embracing position of the animal is facilitated by the recesses 16 in the side wall 11 of the chute (FIG. 1). The gripping harness is closed about the animal with maximum comfort thereto to immobilize it effectively without possibility of injury to the animal as a result of falling to the floor and consequent bruising thereof. In addition, the form of restraint of the animal afforded by the harness H eliminates nearly all danger to personnel.

As illustrated generally in FIG. 1, the animals are conveyed successively between the station I at the head end of the chute through stations II and III, which movement may be effected by an overhead power conveyor. As the animals are slaughtered and the carcasses are ultimately suspended from a bleeding rail R, which may be the initial stage of "on the rail" dressing of the beef, the swing grips units in accordance with the invention are returned for use on the successive animals as they are led to the confining compartment at the head end of the animal chute at station I.

In order to adapt the system for mass production procedures capable of handling as many as seventy pieces of livestock and more per hour, a circular dual rail system 42, 42' is mounted overhead along the circular generatrix line Q (FIG. 1), which in most installations may approximate a diameter of ten feet. Three equidistantly spaced gripper units G moving along this rail system are adequate to transport the successive animals through the successive stations where the above-mentioned operations are performed.

In FIG. 2 is shown a gripper unit G embracing a piece of livestock after the same has been lowered from its position above the animal. This unit consists of a main frame 20 and an auxiliary frame K pivoted therefrom which mounts the bifurcated harness elements for embracing and cradling the animal at its belly and chest.

Each gripper unit is supported from the dual rail system 42, 42' by a pair of fluid-pressure-operated cylinders A and B. Piston rods 23 and 24 extending from the lower ends of cylinders A and B are pivotally mounted to the opposite ends 21, 22 of the frame 20, respectively, to control the angular disposition of the frame from a horizontal line as shown in FIG. 2 to a maximum inclination of 45° as shown in FIG. 5, to impart desired tilting movements to the animal supported thereby. The front cylinder B is supported by rod 28 extending from a horizontal rod 29 on the opposite ends of which are mounted trolley wheels 30, 30', preferably on roller bearings, for ease of movement of the rod 28 as the same travels along the opposed rails 42, 42'. The channel rails 42, 42' may be supported by brackets 40, 40' extending downwardly from plate 41 which may be affixed to the ceiling or other building framework. A drive chain 48 is disposed between the brackets 40, 40' and is supported by a series of hanger brackets 45 mounting trolley wheels 44 which roll along a track 43 extending from the upper portions of bracket 40 (FIGS. 3 and 12). A pin 31 extends upwardly from rod 29 for engagement with the chain 48 so that as the chain is driven, the movement of rod 28 is enforced therewith, carrying with it the cylinder assembly and the gripper unit G supported thereby.

A driving system for the chain 48 may be of any type known in the art, for example, that disclosed in the U.S. patent to Bliss, et al., No. 1,291,738, January 21, 1919. The prime mover for the chain may be located on the kill floor and suitable belting or chain transmission may extend therefrom to drive chain 48.

A similar supporting arrangement for rear cylinder A from the rails 42, 42' is afforded by trolley wheels 32, but in this case no engagement between the wheels 32 and the chain 48 is provided, in order to afford a freedom of approaching and receding movement between the cylinders, as necessitated by the tilting movements executed by the frame 20, and as is evident by a comparison of the spacing between rods 27 and 28 in FIGS. 4 and 5.

FIG. 9 is an enlarged view of the frame 20, wherefrom the gripping harness H for embracing and cradling the animal is suspended. Harness trunnions 55 are pivotally mounted on the opposite ends of a rod extending through the mid-portion of frame 20, and downwardly extending arms 66, 66' (FIG. 3) extend from these trunnions to support a perimetric auxiliary frame K composed of front 53, rear 52 and sides 54, 54'.

A harness tipping cylinder C, housing a piston and piston rod 51, is connected to the rear end of the frame 20 at trunnions 50, and the free end of the piston rod 51 is pivotally connected to the rear bar 52 of the frame K. The actuation of tipping cylinder C effects a rotation of frame K around trunnions 55 to bring the frame and the body harness carried thereby from its position shown in FIGS. 2 and 9 to that shown in FIG. 4. This rotary movement may amount to 35°.

As shown in greater detail in FIG. 10, a pair of metal gripping jaws 56, 56' are pivotally mounted from rods 54, 54' and the upper ends 57, 57' of these members are pivotally connected to the outer ends of opposed piston rods 59, 59' in gripper actuating cylinder 60 which is adapted to be actuated by fluid pressure. Cushioning bands of wide fabric belts, slings or padding, are provided along the inner face of each of the grips 56, 56' and these are preferably tensioned by springs 65, 65', respectively, to afford a cushioning embrace for the hind portion of the animal without harm or bruising. The extension of the piston rods 59, 59' from the cylinder 60 serves to force the cushioning bands 62 and 62' in close but yielding embrace of the animal at the rear portion of its belly, and this embrace is made secure by the provision of an automatically locking latch 61 adjacent to the open ends of the jaws for making certain that no unintentional opening or spreading of the grips may occur in the course of the handling of the animal. The grips, cushioning bands and tension devices are of rugged design capable of cushioning animals weighing as much as 600 to 1,500 pounds.

The constructions shown in FIG. 10 for embracing the hind portion of the animal is duplicated at the front portion thereof whereat is provided pivoted grips 56a and 56a' for embracing the forepart of the belly of the animal which is connected conjointly with grips 56b and 56b' for embracing the chest of the animal. The grips at the forepart of the belly and the chest may be cushioned by tensioned or padded fabric belts or slings 62a and 62b, as shown in FIG. 9, and these are designed to be operated conjointly from a unitary actuating cylinder 60' at the forepart of the harness frame.

The cylinders 60 and 60' are designed for conjoint operation to actuate the body harness H into engagement with the animal or to release the same therefrom. The body harness may assume other structural forms as long as the animal is supported thereby securely and comfortably.

The body harness H described above is lowered into the position shown in FIG. 2 by controlling the front and rear cylinders B and A to disposed the main frame bar 20 in horizontal position wherefrom the auxiliary harness frame K is also disposed in horizontal position by the vertical disposition of the supporting arms 66, 66' from the trunnions 55. As stated above, the cylinders A and B may be operated by fluid pressure, either pneumatically or hydraulically, to selectively maintain the frame 20 in horizontal position, or to impart a tilt to the latter, amounting to 45°, as shown in FIG. 5. In addition, the auxiliary harness frame K may be tilted to an aproximate limit of 35° to the horizontal by withdrawal of the piston rod 51 into the tipping cylinder C, as illustrated in FIG. 4.

The slaughtering operation in accordance with ritual requirements proceeds as follows:

The animal L, confined in its compartment, is designed to have the body harness H passed thereover and locked in embracing position by the simultaneous actuation of the cylinders 60 and 60', and the bifurcated jaws of the harness are securely locked in this position by locking device 61. Thereafter, both cylinders A and B are simultaneously actuated in synchronization to lift the animal in upright position for a distance of about 7" from the floor P, after the pen is opened by retracting slidable gate 13 and swinging gate 14. Thereafter the power operated conveyor 48 is actuated to transport the animal supported by the gripper unit G by movement of trolleys 30 and 32 along double rail 42, 42', which movement is enforced by the engagement of pin 31 with conveyor 48. In the course of the movement of the animal from station I to station II the harness tipping cylinder C is actuated to tilt the forepart of the animal downwardly 35°, in which position the animal arrives at the ritual slaughtering station II, shown in FIG. 4. The cushioned action of the tipping cylinder C is so designed that this angular movement is imparted to the animal without shock or any other harm thereto.

The power conveyor 48 is halted at station II whereat the slaughtering operation is performed by a religious functionary and his assistant who applies a snout harness Y to the head of the animal to accurately position its throat for cutting by the former with a single swift and uninterrupted horizontal sweep of a knife, which is of more than razor-edge sharpness and smoothness, in such a manner that it instantaneously severs the trachea, oesophagus, carotid arteries and jugular veins, thereby immediately rendering the animal unconscious and insensitive to any feeling or pain.

A drain D, extending along a circular track of the floor concentric with the dual rail 42, 42', serves to carry off the blood flowing from the animal.

As indicated in FIG. 4, the shackle end 76 of a shackle chain S is applied to one leg of the animal, either slightly before or immediately following the slaughtering operation, and the opposite end of the chain, to which is connected the frame 75 with trolley wheel 78, is mounted upon an inclined chain lift 70 extending adjacent to a rail 72 which extends below the curved path of the dual rail 42, 42'. Lugs 71 are provided at spaced points of conveyor 70 which serve to entrain the individual frames 75 of the shackle chains as the same are engaged therewith. The low end of the chain lift is at such a distance below the circular rail 42, 42', that initially the chain shackle S is engaged by one of the lugs 71 with slack therein, which is gradually eliminated as the shackle travels up the inclined chain lift. Thereby no shackle hoisting of the animal occurs while it is in a conscious state.

After the execution of the ritual slaughtering operation, the conveyor 48 is actuated for movement again to advance the animal from station II to station III. During this movement of the frame G, cylinder B extends piston rod 24 therefrom, while piston rod 23 is withdrawn into cylinder A, as shown in FIG. 5. Thereby frame bar 20 is tipped approximately 45° from the horizontal, which, together with the inclination of the auxiliary frame K to frame bar 20 of 35°, as existed with the parts positioned as shown in FIG. 4, brings the animal into an angular position approximating 80° to the horizontal, as the same approaches the bleeding rail R (FIG. 5). Furthermore, as the animal travels from station II to station III, the slack in the shackle chain S is eliminated, and the weight of the animal is supported jointly from the shackle chain riding on rail 72 adjacent to chain 70, and the frame G supported from the double track 42, 42'.

Rail 72, adjacent to the inclined chain lift, on which ride the trolleys 78 of the shackle frames 75, merges with the bleeding rail R shortly in advance of station III of conveyor 48, and at the point of such mergence, which may be approximately 10° in advance of station III, the trolley wheel 78 rides off the inclined rail 72 onto the bleeding rail R, which is inclined downwardly to a slight degree from its highest point at the point of mergence with rail 72 wherefrom the trolley 78 may roll downwardly for subsequent dressing operations as indicated in dotted lines in FIG. 7. The frame 75 of the shackle chain, upon arrival at the main bleeding rail, and upon disengagement from its entraining lug which travels back on the return flight of the chain lift, may automatically deenergize the grippers from embracing relationship with the animal by remote actuation of the gripper cylinders 60, 60'. The slaughtered animal is now supported entirely by the shackle chain. Upon the next actuation of conveyor 48 the frame G may now travel to station I, for application to another animal in the head end of the confining chute to repeat the cycle of operation described above, at the same time that a slaughtered animal is travelling from station II to station III and a live animal is travelling from station I to station II.

The successive indexing of the power conveyor 48 may be controlled manually or by foot from any desired supervisory station, or from one of the operating stations, which may be the slaughtering station II, because this point may control the rate of advance of animals for successive movement from station I through station III.

While the preceding mode of operation deals specifically with the handling of animals for ritual slaughtering, the system is as well adaptable for conventional slaughtering operations as practiced extensively in modern slaughering plants, but which clearly avoids the practices found objectionable by humane societies, particularly in respect to the shackling and hoisting methods which are practiced preparatory to the slaughtering of animals.

In order to adapt the system to conventional slaughtering operations, a platform 17 is pivotally mounted about a vertical axis 18 at the head end of the animal chute. While FIG. 1 shows this platform in inoperative position when the ritual slaughtering is in progress, the same may be swung into the position shown in dotted lines for conventional operation. In such position the operator stands beside the head of the animal to accurately impart the blow or shock thereto for stunning the animal into an unconscious state.

The animal is confined within the head end of the chute and is restrained by lowering and closing the body harness H in the same manner as done in the case of preparation for ritual slaughter. The animal is suspended within the gripper units, and with the positioning of the knocker's platform immediately adjacent the animal in fixed position, the animal is immobilized without causing it any pain. In view of the suspension of the animal, the animal is incapable of slumping or consequent bruising, and the possibility of injury to personnel is eliminated. In view of the fact that the animal is in an unconscious state, and is insensible to pain, it is in readiness for slaughter without first having been shackled, hoisted, thrown, cast or cut.

The gates 13 and 14 are withdrawn to clear the animal for transport from station I. As the animal clears the chute, a shackle is placed around its hind leg and the trolley 78 is placed on the inclined chain lift 70 and rail 72. The animal may be indexed from station I to station III whereat the slaughtering operation may be performed. Although the stop at station II is rendered unnecessary, the slaughtering may be done at that station as well, since the conveyor is indexed every 120° to permit the frame G which has been released from a preceding animal at station III to be arrested at station I for application to a live animal. The unconscious animal, in the course of travel from station I to station III assumes the successive positions illustrated in FIGS. 4 and 5 and, in the nearly vertical position indicated in FIG. 5 in station III, when the major weight of the animal is sustained by the shackle S, the animal may be slaughtered by sticking, bleeding or in any other manner practiced in slaughterhouse operation. The gripping cylinders 60, 60' are energized to release the frame G from the slaughtered animal, and the conveyor 48 is actuated to bring the freed frame G to station I to mount on another animal. The slaughtered animal moves along the bleeding rail R, as shown in FIG. 7.

Thus, it is seen that the handling of the livestock preparatory to slaughter by any method is humane, judged by any standards. At no time are the animals shackled or hoisted while in a conscious state. Rather, they are handled as are animals by veterinarians in the course of treatment thereof. Furthermore, the animals are in proper condition and position for ritual slaughtering since they are fully conscious and healthy at the moment of slaughter.

The system may be changed in many respects to adapt the same to varying conditions and plant layouts. Thus, while the circular arrangement of the path of travel of the animals is the most compact, the pattern of this endless path may be modified and more than the minimum number of three gripping frames may be utilized. Such frames may be suspended from a rigid rotary framework rather than moved along by a flexible power conveyor system.

The animal confining pen or tapered chute may be modified in several respects within the spirit of the invention. For example, the successful operation of the chute may be achieved with a lesser number of gates, said gates having different operating characteristics than those specifically illustrated herein. Thus, vertical drop gate 12 may be combined with the horizontally swinging gate 14 into a single vertically swing gate. In addition, sliding gate 13 may be a drop gate, of the type now used on existing knocking pens.

While we have described our invention as embodied in a specific form and as operating in a specific manner for purposes of illustration, it should be understood that we do not limit our invention thereto, since various modifications will suggest themselves to those skilled in the art without departing from the spirit of our invention, the scope of which is set forth in the annexed claims.

We claim:

1. An apparatus for handling animal livestock for slaughtering, comprising a segregating pen having a confining compartment for receiving a single animal in normal standing position, overhead means for embracing the body of the animal while in said normal standing position, an overhead travelling support for mounting a plurality of said means at spaced distances, a slaughtering station and a bleeding station for the animal spaced from said confining compartment and within the range of operation of said travelling support, and means for conveying the animal to said bleeding station and hoisting the animal in the course of travel thereof only after the animal is in an unconscious state.

2. An apparatus for handling animal livestock for slaughtering, comprising a confining pen for receiving an individual animal in normal standing position, said pen being defined by an end wall, a fixed side wall, a slidable side wall selectively slidable to and from said end wall, and a pivoted gate rotatable about a vertical axis at the rear end of said fixed side wall adapted to force the animal into standing position closely adjacent to said first-mentioned end wall, an overhead unit for selectively embracing the body of the animal for lifting and bodily transport from said pen, said slidable side wall and pivoted gate adapted to be moved away from the animal preparatory to the lifting and transporting movements thereof.

3. An apparatus as set forth in claim 2, including a movable platform selectively shiftable into position in front of the outer confines of the pen for the accommodation of an operator thereon.

4. An apparatus as set forth in claim 3 wherein said movable platform is pivoted about a vertical axis at the front end of said pen adjacent to said fixed side wall.

5. An apparatus for handling animal livestock for slaughtering comprising a confining pen for receiving an animal in normal standing position constituting a restraining station at said pen, selectively engageable and releasable gripping means for embracing the body of the live animal while in said normal standing position, an endless overhead track for supporting a plurality of said gripping means for movement thereon at equally spaced distances, an endless conveyor engaging said means adapted to be actuated successively for a traverse corresponding to said distances, a slaughtering station and a bleeding station for the animal spaced from said restraining station at distances corresponding to said equally spaced distances and below said endless track, and means for releasing said gripping means from the slaughtered animal at said bleeding station for return to said restraining station during at least the next advancing movement of said endless conveyor.

6. An apparatus for handling animal livestock for slaughtering comprising a confining pen for receiving an animal in normal standing position constituting a restraining station at said pen, selectively engageable and releasable gripping means for embracing the body of the live animal while in said normal standing position, a circular overhead track for supporting a plurality of said gripping means for movement thereon at equally spaced distances, a circular conveyor engaging said gripping means adapted to be actuated successively for a traverse corresponding to said distances, a slaughtering station and a bleeding station for the animal spaced from said restraining station at distances corresponding to said equally spaced distances and below said endless track, and means for releasing said gripping means from the slaughtered animal at said bleeding station for return to said restraining station during at least the next advancing movement of said endless conveyor.

7. An apparatus as set forth in claim 6 wherein the plurality of gripping means comprise three units uniformly displaced by 120° around said circular track.

8. In a system for the humane handling of animal livestock for slaughtering, a plurality of overhead travelling gripping mechanisms for embracing and supporting the animals through successive stages of the handling and slaughtering operations, each mechanism comprising a main frame and an auxiliary frame pivoted to the rear end of said main frame, a body harness mounted on said auxiliary frame, power-operated means on said auxiliary frame for selectively embracing a live animal therewith and releasing the slaughtered animal therefrom, means for tipping the auxiliary frame on said main frame from a horizontal plane during one of said stages, and means for additionally tipping said main frame from a horizontal plane during another one of said stages.

9. An apparatus as set forth in claim 8 wherein the means for tipping the auxiliary frame is effective through an angle of approximately 35° and the means for tipping the main frame is effective through an angle of approximately 45°.

10. An apparatus as set forth in claim 8 wherein said body harness comprises a pair of bifurcated cushioned gripping jaws for embracing the body of the animal forwardly of its hind legs, another pair of divergently-pronged bifurcated cushioned gripping jaws for embracing the body of the animal forwardly and rearwardly of its front legs, and said power-operated means comprising pressure-operated cylinders for actuating said pairs of gripping jaws in unison into closed and open positions.

11. In a system for the humane handling of animal livestock for slaughtering, a circular overhead track overlying a pen for a single animal at one point of the circumference thereof, a slaughtering station and a bleeding station equidistantly spaced from said point, three animal gripping mechanisms equidistantly spaced on said track and overlying said pen and said stations, and means for successively advancing said gripping mechanisms in unison.

12. An apparatus as set forth in claim 11 including an overhead bleeding rail extending from said bleeding station in an outward direction from said circular track, and an inclined chain lift and rail extending from a low level at said slaughtering station to said overhead bleeding rail at said bleeding station for hoisting a shackled animal following its slaughter onto the bleeding rail.

13. In a system for the humane handling of animal livestock for slaughtering, a circular overhead track overlying a pen for a single animal at one point of the circumference thereof, a slaughtering station and a bleeding station equidistantly spaced from said point on each side thereof, three animal gripping mechanisms equidistantly spaced on said track and overlying said pen and said stations, means for successively advancing said gripping mechanisms in unison, and means for varying the inclination of said gripping mechanisms from the horizontal at said pen to a slight horizontal angularity at said slaughtering station and nearly vertical angularity at said bleeding station.

14. An apparatus as set forth in claim 13 including devices on said gripping mechanisms for embracing the body of the animal at said pen in horizontal position preparatory to the lifting and circular transport thereof, and for releasing the body of the slaughtered animal at said bleeding station to free the gripping mechanism thereat for circular transport to the animal pen for application to another live animal in the pen.

15. In a system for the humane handling of animal livestock for slaughtering, a horizontal circular overhead track overlying a pen for a single animal at one point of the circumference thereof, a slaughtering station and a bleeding station equidistantly spaced from said point on each side thereof, three animal gripping mechanisms equidistantly spaced on said track and overlying said pen and said stations, each mechanism comprising a main frame, a pair of vertically disposed fluid pressure cylinders, each having the lower end thereof connected to one end of said main frame, and the upper end thereof supported from said track, an auxiliary frame pivoted to the rear end of said main frame, a body harness mounted on said auxiliary frame, power-operated means on said auxiliary frame for selectively embracing a live animal therewith and releasing the slaughtered animal therefrom, a circular conveyor coextensive with said circular track and engaging the upper end of one of the cylinders of each mechanism, means for successively advancing said conveyor and mechanisms, an auxiliary fluid pressure cylinder on said main frame for tipping the auxiliary frame on said main frame from a horizontal plane during the travel of one of the mechanisms from said point to said slaughtering station, and means for differentially extending said pair of fluid pressure cylinders for additionally tipping said main frame from a horizontal plane following the advance of said last-mentioned mechanism from said slaughtering station towards said bleeding station.

References Cited in the file of this patent

UNITED STATES PATENTS

| | | |
|---|---|---|
| 2,526,037 | Murphy | Oct. 17, 1950 |
| 2,708,768 | Bain | May 24, 1955 |
| 2,733,477 | Murphy | Feb. 7, 1956 |
| 2,737,683 | Regensburger | Mar. 13, 1956 |
| 2,895,164 | Murphy | July 21, 1959 |
| 2,978,737 | Hughes | Apr. 11, 1961 |
| 2,979,762 | Schulz | Apr. 18, 1961 |